United States Patent [19]
Roberts

[11] 3,877,151
[45] Apr. 15, 1975

[54] METHOD OF CHECKING HORIZONTAL SPACINGS ON A CRANKSHAFT
[75] Inventor: George W. Roberts, Markham, Ill.
[73] Assignee: Allis-Chalmers Corporation, Milwaukee, Wis.
[22] Filed: Oct. 15, 1973
[21] Appl. No.: 406,659

[52] U.S. Cl......... 33/180 B; 33/125 R; 33/181 AT; 51/105 SP; 51/165.74; 51/277; 51/289 R; 82/9
[51] Int. Cl....... B23q 17/02; B24b 5/42; B23b 5/18
[58] Field of Search........ 33/180 B, 181 A, 181 AT, 33/125 M, 125 A, 125 R; 51/105 SP, 165.74, 165.75, 277, 289 R; 82/9

[56] References Cited
UNITED STATES PATENTS
3,417,478  12/1968  Jeanneret.................. 33/181 A
3,624,910  12/1971  Farrand..................... 33/125 R Primary Examiner—Richard E. Aegerter
Assistant Examiner—Steven L. Stephan
Attorney, Agent, or Firm—Arthur L. Nelson

[57] ABSTRACT

A method of measuring bearing surfaces and bearing spacings on a crankshaft by establishing a reference surface on the crankshaft supporting structure and pre-setting a zero position of a probe on a digital readout at the reference surface. Upon establishing a zero reading, facings associated with the bearing are established at pre-set dimensions in accordance with standard crankshaft dimensions for providing necessary information for subsequent machining operations.

5 Claims, 10 Drawing Figures

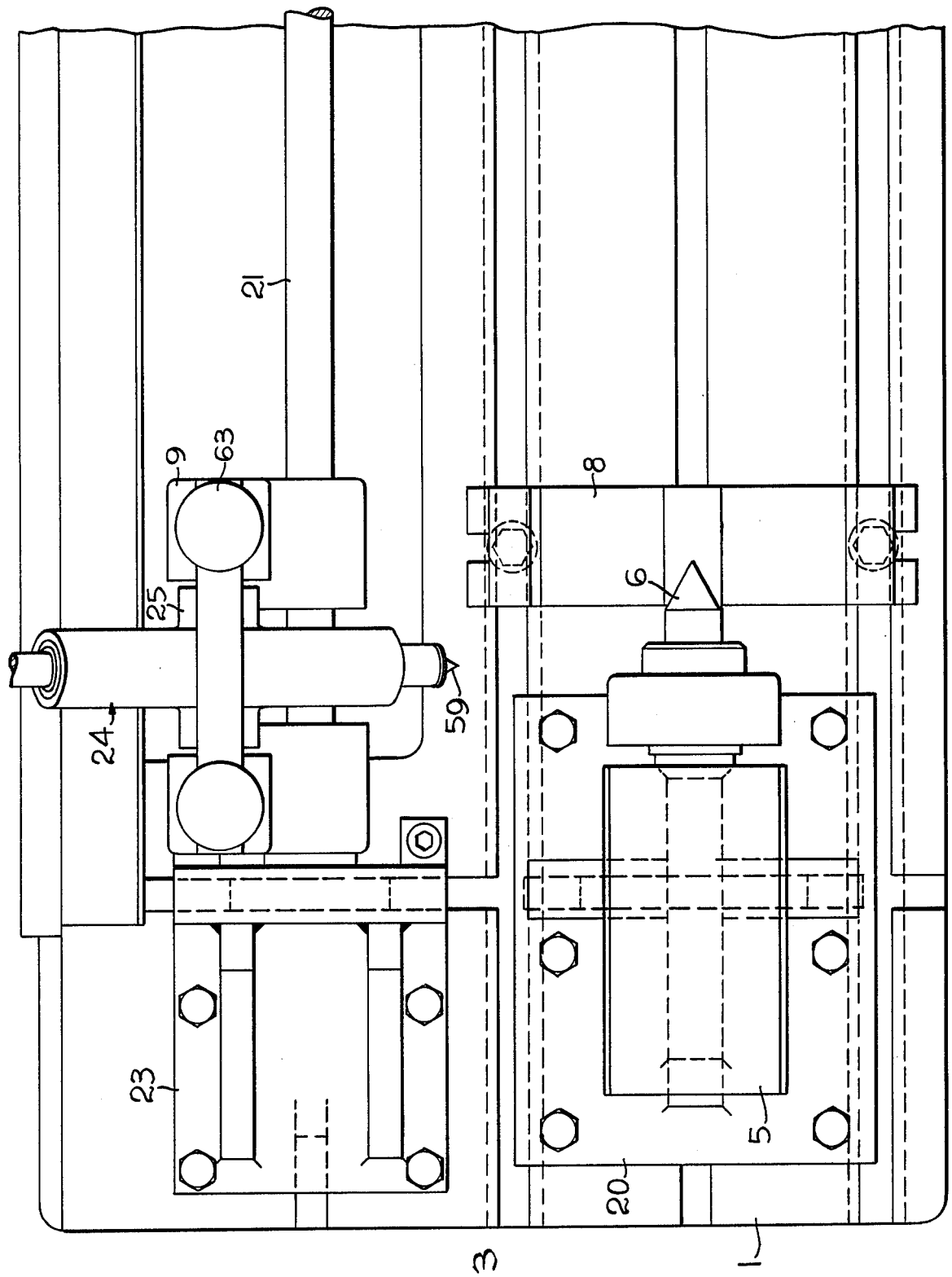

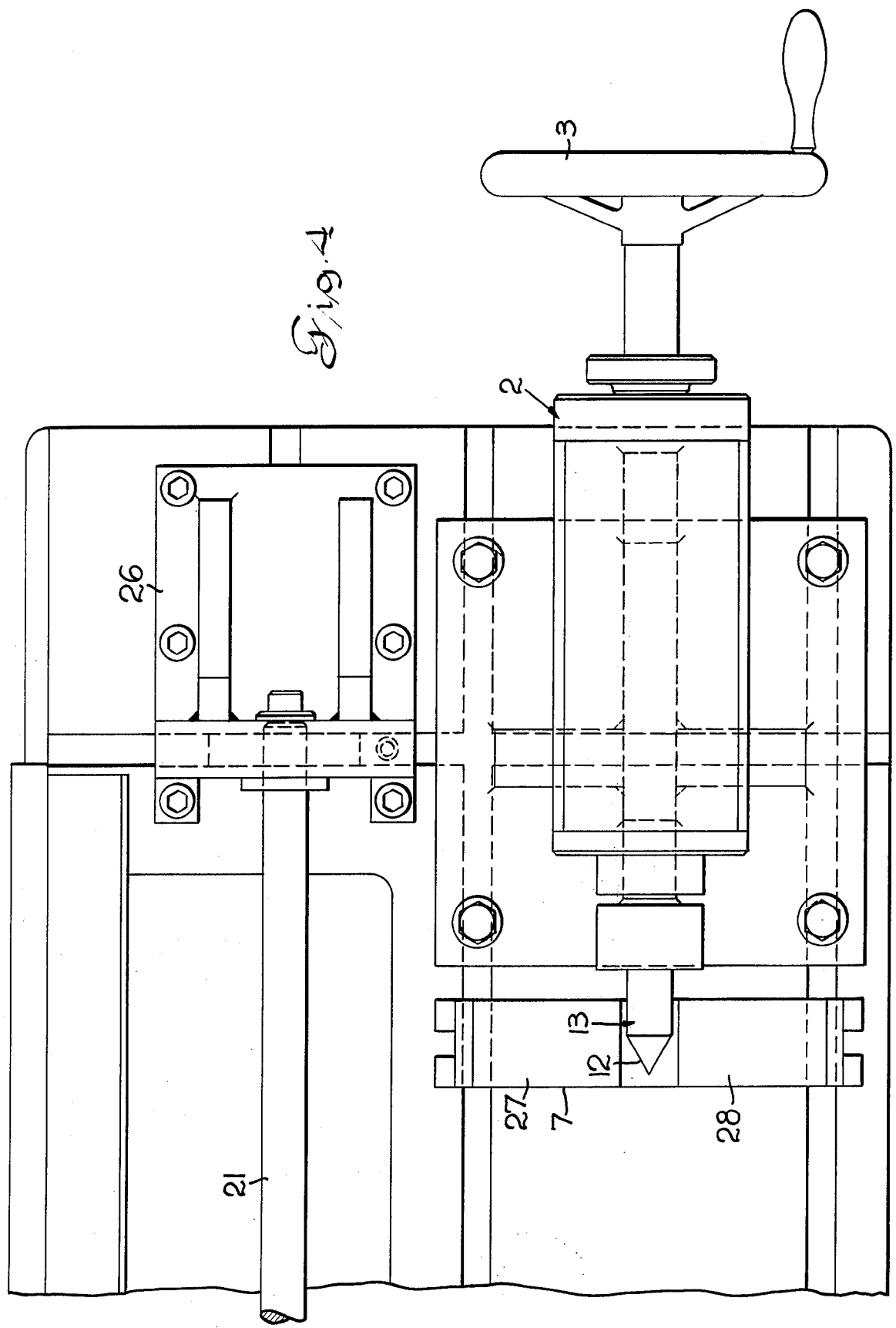

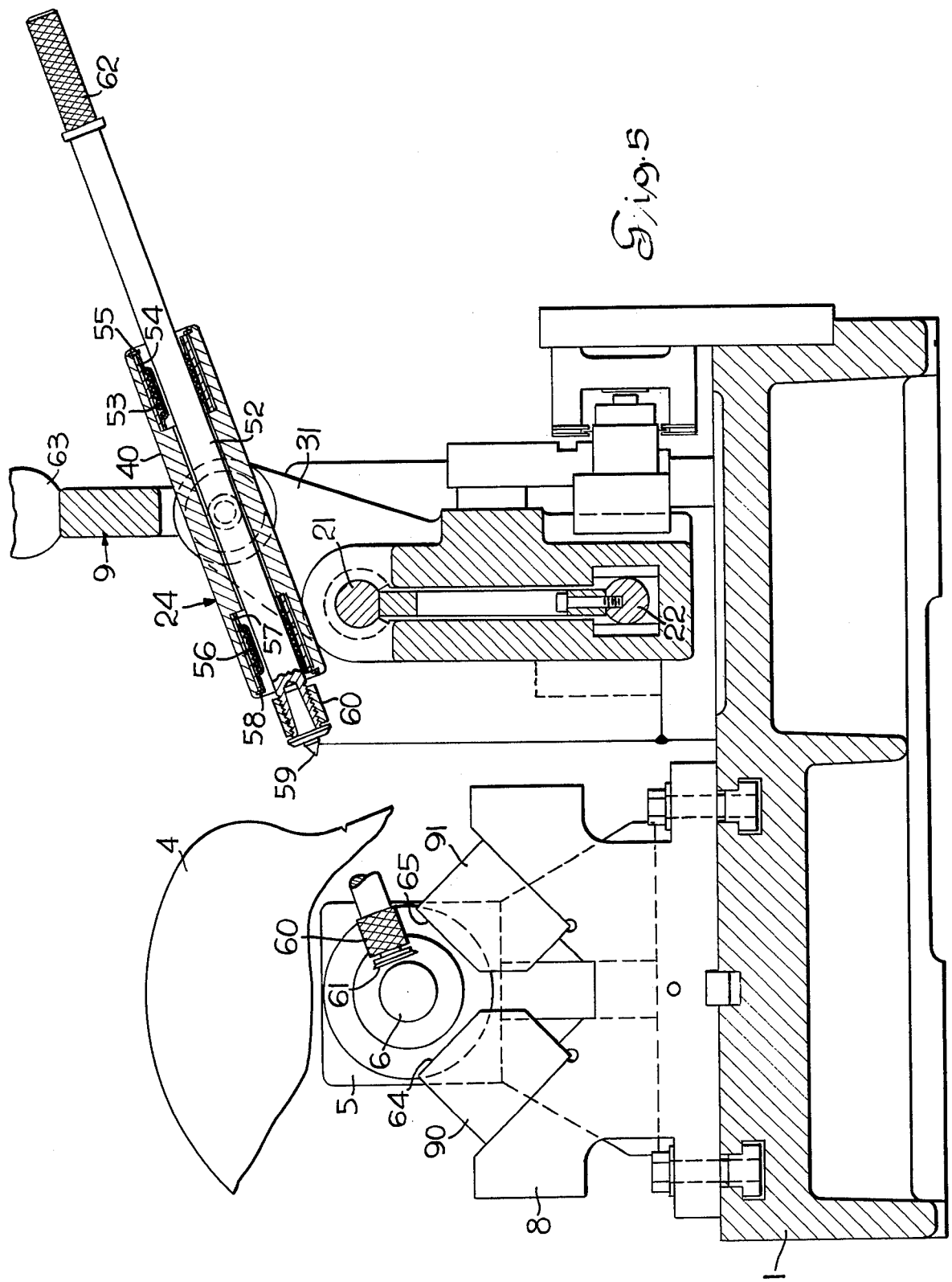

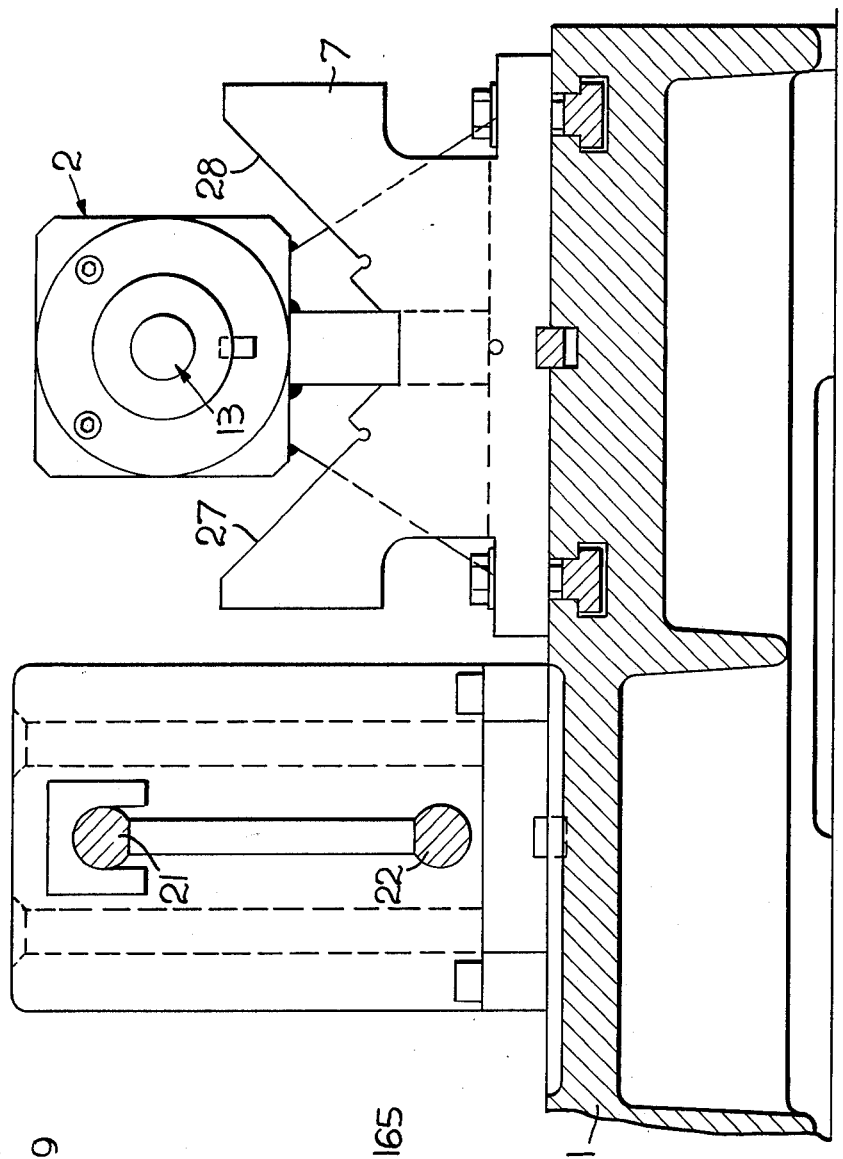
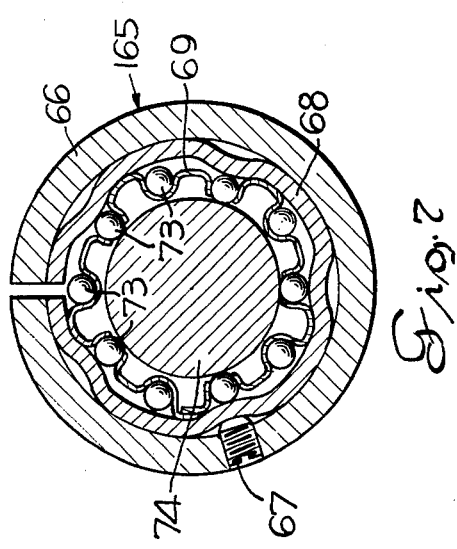
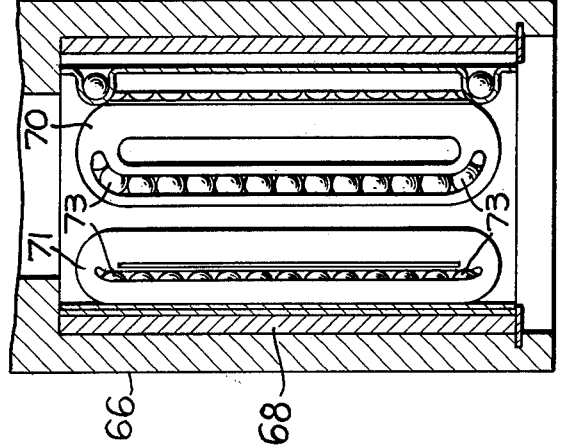

METHOD OF CHECKING HORIZONTAL SPACINGS ON A CRANKSHAFT

This invention relates to a method of measuring crankshaft bearings and more particularly to a method of measuring crankshaft bearing locations from a reference surface on a supporting structure supporting the crankshaft in accordance with predetermined crankshaft specifications and for establishing information for subsequent machining operations for providing a balanced crankshaft with the least machining of material.

The machining operations for forming crankpin and main bearings on a crankshaft require precision alignment and precision machining. In the process of manufacturing a conventional method for measuring crankshafts is to place a master crankshaft between centers and pre-set a plurality of micrometers having dial indicators on a single bar for engaging the machined faces of the crankshaft. The readings of the dial indicators indicate to the operator the desired position of each of the facings on the crankshaft at which the bearings should be located. The master crankshaft is then removed and the crankshaft to be machined is then placed in the fixture. The dial indicator readings of the micrometers are then read and an analysis is mentally made by referring to the specifications print indicating the bearing locations. A predetermined allowance is made for grinding stock on each face which generally is approximately fifteen thousandths of an inch. This information is then orally given to the machine operator and the crankshaft is then machined to comply with the master crankshaft which is in conformity with the specifictions on the referenced drawing. This procedure is time consuming and often leaves a chance for errors, and once the crankshaft is machined it cannot be re-done particularly where too much metal has been removed from the crankshaft.

Conventional forged crankshafts are manufactured with dimensions marked on the crankshaft. Centrally located in each end of the crankshaft is a coned recess for reception of the centering cones of the alignment apparatus. Also, an imaginary plane normal to the longitudinal axis of the crankshaft is established by a ball of predetermined size received in the conical recess on the flange end of the crankshaft. The imaginary plane is tangent to the crankshaft end of the ball and is a predetermined dimension from a punch mark on one of the center cheeks of the crankshaft. With this relationship of alignment and the dimension established a crankshaft can be machined and all faces will clean up and a minimum amount of stock removal will be required for balance.

Accordingly, a method for establishing bearing surfaces from a predetermined reference face will provide information for subsequent machining operations on the crankshaft. The method includes a means for holding the crankshaft and establishing a predetermined relationship between a reference surface on the supporting structure and known axial dimensions on the crankshaft to establish facings on a bearing and bearings locations at predetermined axial spacing.

Accordingly, it is an object of this invention to provide a method of measuring spacings and bearing surfaces on a crankshaft.

It is a further object of this invention to provide a method of checking longitudinal dimensions on a crankshaft from a predetermined reference surface on the crankshaft supporting structure with known axial dimensions established according to crankshaft specifications.

It is a further object of this invention to provide a method of axially aligning a crankshaft on predetermined crankshaft supporting centers and for measuring axial dimensions on the crankshaft from an established reference surface on the supporting structure. The bearing surfaces are measured with relation to the reference surface on the supporting structure to assure a minimum of machining and a balanced crankshaft when the subsequent machining operation is completed.

The objects of this invention are accomplished by placing a crankshaft on a preliminary support for carrying the crankshaft while subsequently pressing aligning centering cones of the crankshaft support into conical recesses in the ends of the crankshaft to align the crankshaft on the axis of the aligning cones. A measuring device reciprocally moving on an axis parallel with the coincidental supporting axis and crankshaft axis having a probe establishes a zero reading from a reference surface of the supporting structure and engages bearing surfaces to establish bearing positions axially spaced along the axis of the crankshaft. The measuring of the surfaces and bearing spacing on the crankshaft is according to crankshaft specification and assures subsequent machining operations will be accurately made along the crankshaft and the crankshaft can be machined with a minimum of removal of material and the crankshaft will be balanced when the subsequent machining operations are completed. Referring to the drawings:

FIG. 3 is a plan view of the headstock of the aligning device and the measuring carriage in its extreme left-hand position.

FIG. 4 is a plan view of the tailstock and the right-hand rail mount for the carriage.

FIG. 5 is a cross section view taken through the carriage and the rails and also taken immediately in front of the headstock of the alignment device;

FIG. 6 is a cross section view taken through the carriage rails and the alignment device showing the preliminary alignment block on the right-hand side of the apparatus.

FIG. 7 is a cross section view of one of the linear bearings showing the bearing tightening set screw.

FIG. 8 is a cross section view taken axially of one of the linear bearings as used on the alignment probe to show the mounting of the recirculating balls in the retainer sleeve of the linear bearing.

Figure 1:
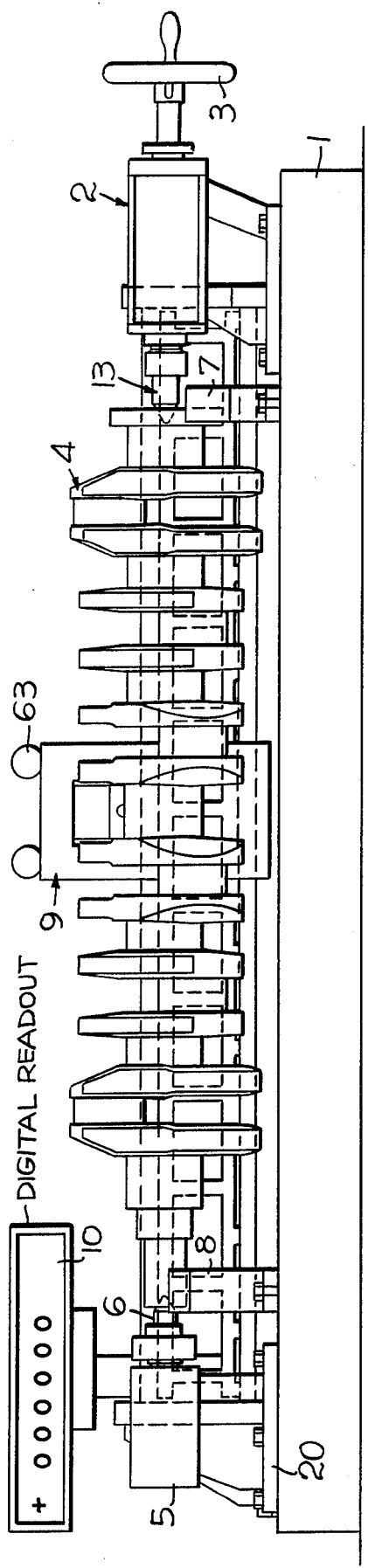
FIG. 1 illustrates a front view of the apparatus.

FIG. 1 shows the bearing measuring apparatus. The apparatus includes the main frame 1, the tailstock 2 is mounted on the right-hand side of the main frame and includes a handwheel 3 for adjustably positioning the dead center 13 for reception in a conical recess in the end of the crankshaft 4.

The headstock 5 includes a spindle nose 6 for reception in a conical recess in the left-hand end of the crankshaft 4. The preliminary alignment blocks 7 and 8 provide support for the crankshaft prior to its engagement with the headstock and a tailstock. By positioning the crankshaft initially on the preliminary alignment blocks 7 and 8, the alignment is sufficiently close that the coned-shaped noses of the dead center 13 and the spindle nose 6 enter the recesses on the ends of the crankshaft as the handwheel 3 moves the dead center towards the crankshaft. The carriage 9 is mounted on rails which are axially aligned parallel with the axis of the crankshaft. The carriage 9 moves on linear bearings which embrace the rails and support the carriage.

The digital readout 10 is also positioned on the frame of the measuring apparatus or on a pedestal adjacent to the apparatus for providing a digital readout of the carriage position relative to a base point which is predetermined prior to measuring of the crankshaft.

The digital readout 10 may be one of various forms of digital readouts, however the Cordax digital readout manufactured by the Bendix Company is an ideal digital readout which adapts itself well to this type of measuring. The Cordax readout provides for a graduated transparent scale along the length of the rails with a light source directing light through the scale. A photoelectric cell senses the light signal and generates an electrical signal as the carriage is moved along the scale. The pickup from the photoelectric cell is then transmitted through an electrical circuit which in turn provides a digital readout from the Cordax as shown in FIG. 1.

Figure 2:
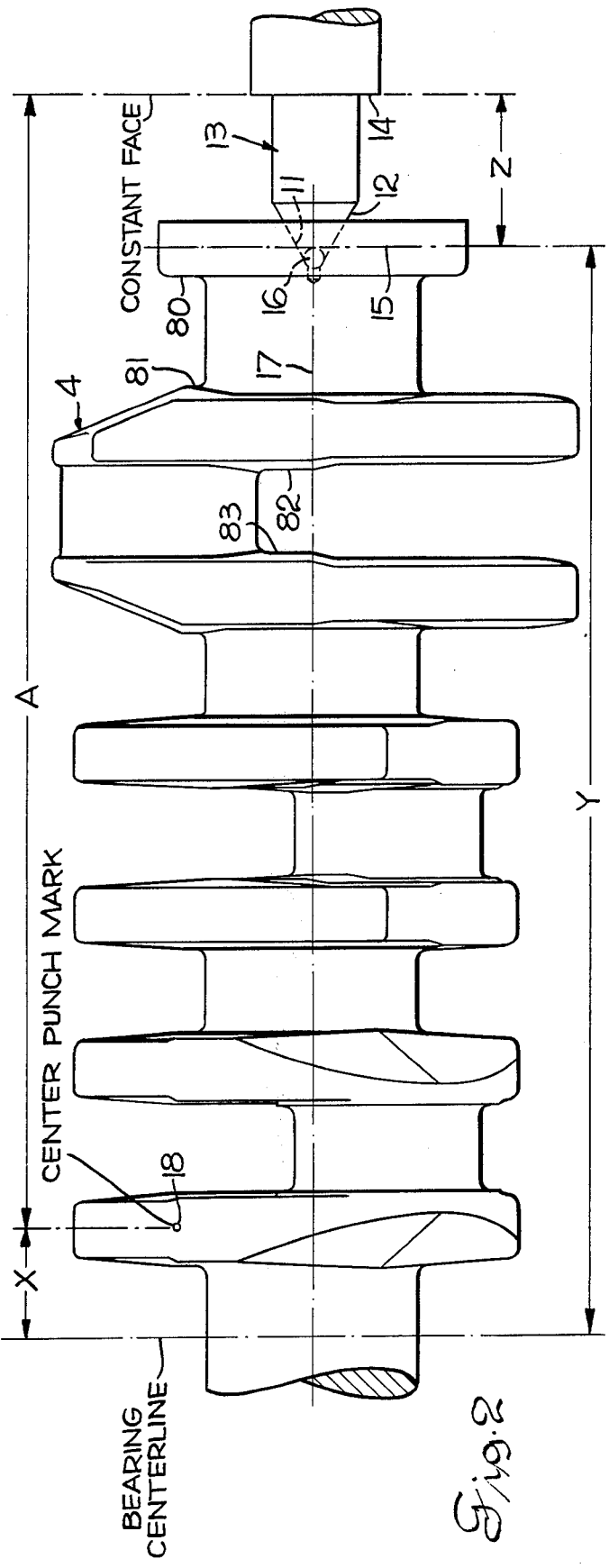
FIG. 2 is an enlarged view of the right-hand end of the crankshaft showing the tailstock engaging the end of the crankshaft and the base dimensions on the crankshaft and crankshaft support.

FIG. 2 shows an enlarged view of the crankshaft 4 which is to be measured. The crankshaft 4 is provided with a conical recess 11, which engages the conical surface 12 of the dead center 13. The dead center 13 forms a reference surface or facing 14 which operates as the zero reference plane in the readout system. An imaginary plane is formed at 15. This plane is defined by a ball 16 of a predetermined diameter which engages the conical surface 11. The extreme right-hand limit of the ball is tangent to the imaginary plane 15 which is normal to the axis 17 of the crankshaft 4. A predetermined axial dimension from the imaginary plane 15 a center punch mark 18 is located. The axial dimension between the imaginary plane 15 and the punch mark 18 establishes a working relationship from which the operator can work. With the imaginary plane 15 established and the known taper of the dead center 13, the constant face 14 is established which is the base reference surface for the operator.

Figure 9:
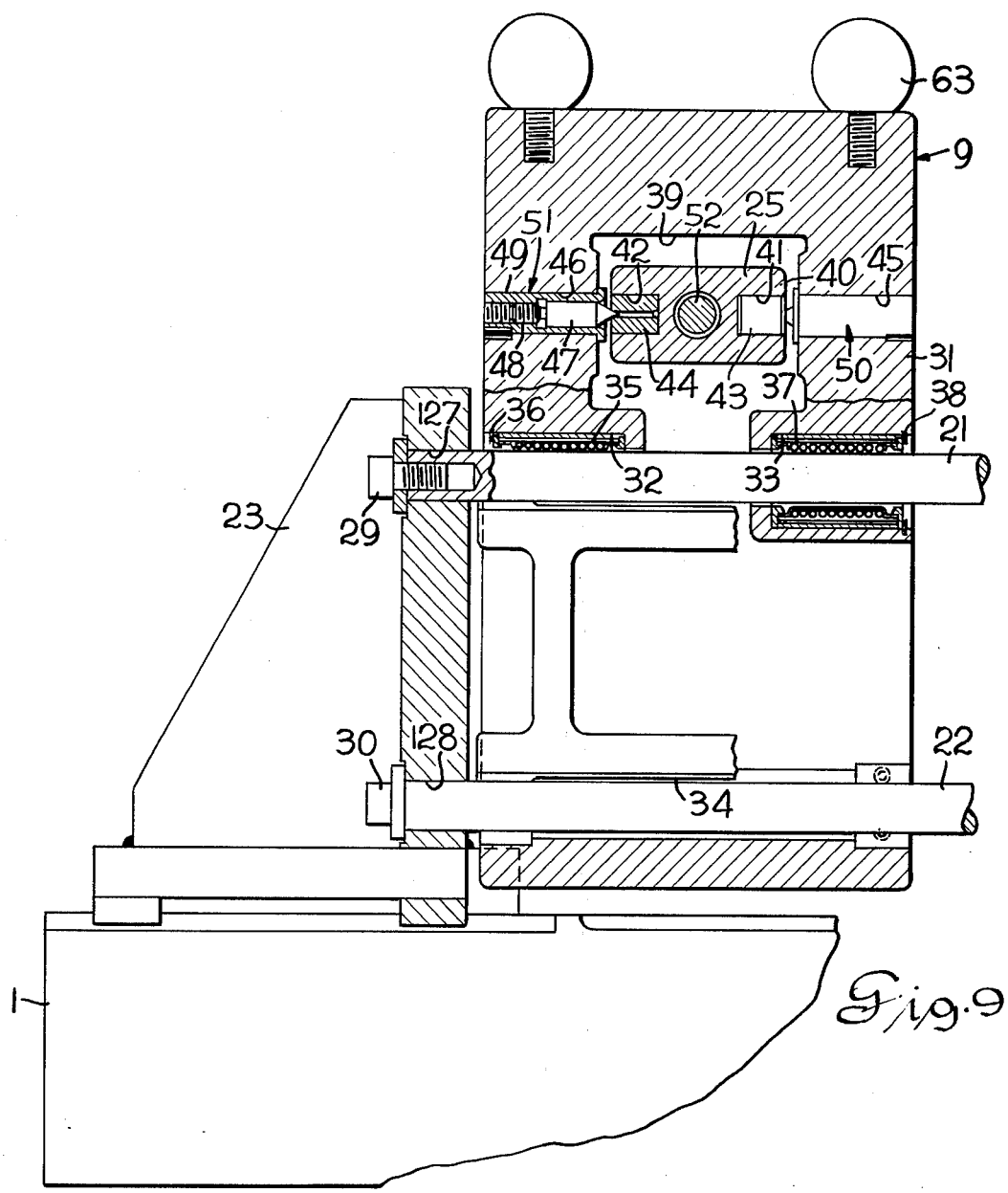
FIG. 9 is a cross section view through the carriage showing the pivotal mount for the probe and a cross section view of a portion of the linear bearings and the rail mounting.

Referring to FIG. 3 the headstock 5 is shown mounted by means of the bracket 20 which is supported on the main frame 1. The headstock is in a fixed axially alignment relative to the rails 21 and 22 of which the upper rail 21 is shown in FIG. 3. The carriage 9 is reciprocally mounted on the rails 21 and 22. The rails 21 and 22 are supported on the rail mount 23 which is fastened by a plurality of bolts to the main frame 1. The probe 24 is carried on a trunnion mount 25. The trunnion mount 25 is shown and described in FIG. 9.

FIG. 4 shows the plan view of the right-hand end of the apparatus. The rail mount 26 is mounted by means of a plurality of bolts on the main frame. The rail 21 is shown receiving the rail mount 26.

The tailstock 2 including the handwheel 3 is provided for a screw positioning of the dead center 13. The conical surface 12 of the dead center 13 is shown immediately above the preliminary alignment block 7 which has supporting surfaces 27 and 28 for placing the flange end of the crankshaft to ready the crankshaft for alignment as it is received on the conical surface 12 of the tailstock 2.

The rails 21 and 22 extend between the rail mounts 23 and 26. Each rail extends into an opening 127 or 128 as shown on the rail mount 23 in FIG. 9. The bolt 29 locks the rail 21 in a rigid position on rail mount 23. The bolt 30 also locks the rail 22 in a rigid position. It is understood that each of the rails have a close fitting tolerance within the opening in which it is mounted to provide an accurate alignment of the rails with reference to the center line of the headstock.

The carriage 9 includes a base 31 having longitudinal openings 32 and 33 through which the rail 21 extends. The rail 22 extends through a longitudinal opening 34. A linear bearing 35 is received within the opening 32 and retained by a snap ring 36. The linear bearing permits the carriage to move freely along the rail 21. Similarly, a linear bearing 37 is received within the opening 33 and retained in this position by the snap ring 38. A pair of linear bearings are also positioned to embrace the lower rail 22 and retained in the base 31 in the same manner as that described for the bearings 35 and 37. Accordingly, the rail moves on the recirculating balls in the linear bearings as the carriage 9 is moved axially on the rails 21 and 22.

The transverse opening 39 receives the probe 24 which is trunnion mounted. The trunnion mount includes a housing 40 having transverse openings 41 and 42 which receive the inserts 43 and 44. The base 31 of the carriage also defines axially aligned holes 45 and 46. The bearing cone 447 is received in a cone-shaped recess in insert 44 and held in this position by an adjusting screw 48. The cone bearing 47 is received within the sleeve 49. A similar arrangement is provided in the righthand end of the trunnion bearing 50 is described for the trunnion bearing 51. Accordingly, the trunnion bearings 50 and 51 have means for adjusting them to provide an accurate alignment and a tight fit as it is rotated about its axis.

The shaft 52 of the probe is slidable within the housing 40. The linear bearing 53 is received within an opening 54 and retained in this position by a snap ring 55. The linear bearing 56 is received within the opening 57 and retained in this position by snap ring 58. The linear bearings 53 and 54 provide a freely slidable bearing structure for the probe 52 as it slides linearly through the bearings.

The conical tip 59 is shown received within a collet 60 which can be tightened to retain the tip in this position for engaging a point on the crankshaft. Similarly, the collet 60 can be loosened to permit positioning of a tip 61 which has a lateral surface for engaging a radial facing on the crankshaft. The zero setting of the readout can be conveniently reset to accommodate either tip 59 or 61 for an accurate measurement of any surface or point on the crankshaft.

The probe 52 is also provided with a knurled section 62 for moving the probe axially through the linear bearings 53 and 56. Handle 63 is provided in the upper portion of the carriage to move the carriage axially on the rails 21 and 22.

FIG. 6 shows a view of the tailstock 2 for supporting the right-hand end of the crankshaft as shown in FIG. 1. A preliminary alignment block 7 is provided with bearing surfaces 27 and 28. FIG. 5 shows the headstock 5 and the preliminary alignment block 8 providing surfaces 64 and 65 for laying the crankshaft in preparation for mounting the crankshaft on the centering nose end of the headstock.

Figure 10:
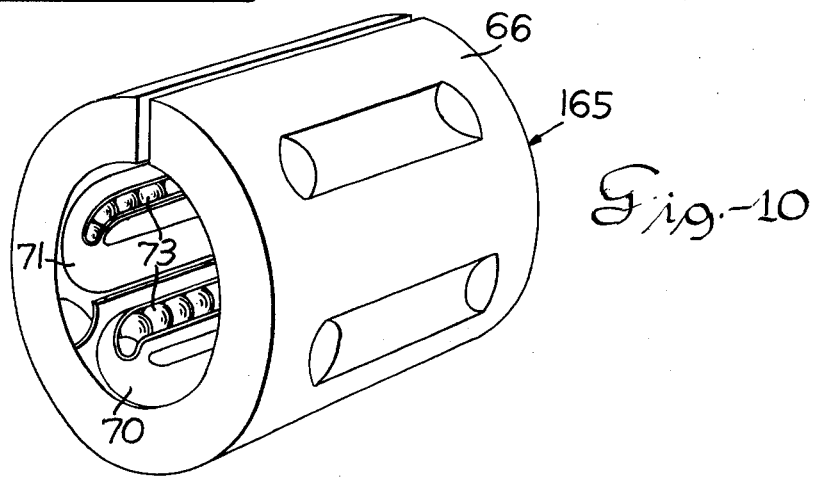
FIG. 10 is a three-dimentional view of one of the linear bearings.

Referring to FIGS. 7, 8 and 10 the linear bearing is shown in detail. The linear bearing 165 includes a split bushing 66 which permits radial expansion and contraction of the sleeve 66. This expansion is primarily for providing a tight fitting of the linear bearing in the housing in which it is received. Also threadedly received in the sleeve is a setscrew 67, which radially contracts a retainer sleeve 68. The retainer sleeve 68 embraces the ball retainers 69. A plurality of ball retainers 69 are shown. The ball retainers provide a plurality of recirculating ball circuits 70 and 71 such as shown in FIG. 8. The balls 73 engage the shaft 74 to permit linear movement of the shaft relative to the linear bearing. The bearings are recirculated in each of their circuits. The balls are rolling in a linear manner when engaging the shaft 74. The bearing is also shown in FIG. 10 in a three-dimensional view, which shows the recirculating movement of the balls in the ball retainers 69. If the bearing becomes loose the setscrew 67 can be tightened against the retainer sleeve to radially contact the retainer sleeve and tighten the balls against the shaft 74 to eliminate any play in the bearings. Such a bearing as illustrated in FIGS. 7, 8 and 10 is manufactured by the Thomson Industries, Inc. for providing linear motion of a shaft relative to the bearing bushing.

A measuring of a crankshaft to locate the bearings is accomplished in the following manner. The crankshaft as shown in FIG. 2 shows the right-hand section of the crankshaft which is positioned on the measuring apparatus. The crankshaft is conventionally forged and then rough balanced to determine the preferred position for the bearings surfaces and the preferred alignment on the crankshaft. This is accomplished by what is known as a basket balancing which rotates the crankshaft to determmine in what position the crankshaft should be machined to require the least amount of machining and still achieve a balanced crankshaft as a finished product. Initially, conical recesses are drilled in the extreme ends of the crankshaft in the position which would accomplish the least machining. As illustrated in FIG. 2 a conical recess is drilled in the flange end or the right-hand end of the crankshaft. This conical recess is of a predetermined taper, and it is drilled to a depth which determines the preferred axial alignment of the bearing locations. An imaginary plane is established by the drilling of the conical recess 11 to a predetermined depth. If a ball 16 of a predetermined diameter be inserted in the conical recess, the right-hand point of the ball would form a point tangent to an imaginary plane 15 which is normal to the axis of the crankshaft. With a dead center of complementary taper and dimension to facing 14 this positions the axial location of the crankpin bearings and the main bearings. A center punch mark 18 is also positioned on one of the center cheeks of a 6 throw crankshaft as illustrated. The center punch mark 18 is positioned a predetermined axial dimension from the imaginary plane 15. Accordingly, the point 18 and the plane 15 together with the axially aligned conical recesses in the end of the crankshaft establish the axis of the crankshaft and the positioning of the bearings on the crankshaft. It is this predetermined plane and axis which then establishes the machining to be done on the crankshaft.

The measuring steps in the manufacture of the crankshaft is to position the crankshaft in the measuring apparatus as set forth in this invention. The flange end or the right-hand end of the crankshaft is positioned on the preliminary alignment block 7 while the left-hand end of the crankshaft is positioned on the preliminary alignment block 8. It is noted that the flange end will then rest on the surfaces 27 and 28 while the left-hand end will rest on the surfaces 64 and 65 of the blocks 90 and 91 on the preliminary alignment block 8. Once the crankshaft is in this position the handwheel 3 of the tailstock 2 is then rotated to force the centering cones of the headstock and tailstock to axially align the crankshaft axis with the headstock and tailstock axis. Accordingly, the axis of the crankshat and the headstock and tailstock are then coincidental.

Since the conical surface 12 is of a predetermined taper complimenting the taper of the recess 11, and recess 11 is a predetermined depth, as the dead center 13 is positioned in the recess 11 the reference face 14 is then a predetermined dimension Z from the imaginary plane 15. Likewise, the dimension A is determinable from this reference, since the reference drawing for the machining of the crankshaft establishes the center of the crankshaft or the center of the center main bearing as a base point for all dimensioning. The dimension from the center punch mark to the center of the centerline of the center main bearing is a dimension X. The dimension Y is the dimension between the imaginary plane 15 and the centerline which extends through the center of the center main bearing in a transverse direction. With these dimensions known then, the position of each of the crankpin and main bearings can then be established by measuring from the reference face 14. With the crankshaft mounted in the measuring apparatus, the probe is then fitted with the proper tip 59 or 61 for measuring of the crankshaft.

With the tip 61 the dimension from the reference face 14 is preset at zero when the surface on the periphery of the tip 61 engages the reference surfaces reference face 14. The facings 80 and 81 of the main bearings and the surfaces 82 and 83 may then be measured and the amount of material to be machined from the bearing is then determined. Subsequent to pre-setting the Cordax or the digital readout to zero at the reference face 14, the reading is automatically made as the probe is moved axially for engagement with the facings 80 and 81 or 82 and 83 on the crankshaft or for any other of the main bearings or crankpin bearings of the crankshaft. With a probe having a tip with a point such as the tip 59 the center punch mark 18 may be measured from any surface on the crankshaft. With the given dimensions from the reference drawing of the crankshaft forging any positioning of the bearings can be determined and an accurate alignment of the bearings on the crankshaft may be readily located.

The probe is at right angles to the axis of the rails and the axis of the crankshaft and accordingly any movement of the probe about its trunion mounting or reciprocally within the base of the probe does not create any error. Accordingly this apparatus provides a convenient way to accurately measure locations of facings and surfaces for bearing on the crankshaft.

The embodiments of the invention in which an exclusive privilege or property is claimed are defined as follows:

1. The method of measuring axial dimensions on a crankshaft having a centering recess of a predetermined taper in each end of the crankshaft with at least one of said recesses having a predetermined axial position relative to an established point in the crankshaft, and crankshaft supporting structure having supporting cones of a complementary taper for supporting the crankshaft on its axis comprising the steps, aligning the axis of a crankshaft co-incidental with the axis of the crankshaft supporting structure, establishing a reference surface on the supporting structure a predetermined axial dimension from said established point on the crankshaft by firmly seating the supporting cones in the crankshaft recesses, providing a measuring device with a digital readout having a probe for measurement on an axis parallel with said crankshaft axis, pre-setting zero of the measuring device at the reference surface of the supporting structure, axially measuring bearing surfaces and establishing bearing positions on the crankshaft at predetermined dimensions from the references surface to thereby provide an aligning and measuring method for a crankshaft and to assure accuracy of subsequent machining operations.

2. The method of measuring axial dimensions on a crankshaft having a centering recess of a predetermined taper in each end of the crankshaft with a predetermined axial position of at least one of said recesses and crankshaft supporting structure having supporting cones of a complementary taper for supporting the crankshaft on its axis comprising the steps as set forth in claim 1 providing a conical surface of the predetermined taper and a predetermined depth of one of the recesses and establishing a predetermined axial relationship between the conical surface and the axial center point on the crankshaft.

3. The method of measuring axial dimensions on a crankshaft having a centering recess of a predetermined taper in each end of the crankshaft with a predetermined axial position of at least one of said recesses and crankshaft supporting structure having supporting cones of a complementary taper for supporting the crankshaft on its axis comprising the steps as set forth in claim 1 providing the reference surface on said crankshaft supporting structure a predetermined dimension from the tapered surface of one of the supporting cones on said crankshaft supporting structure.

4. A method of measuring axial dimensions on a crankshaft having a centering recess of a predetermined taper in each end of the crankshaft with a predetermined axial position of at least one of said recesses and crankshaft supporting structure having supporting cones of a complementary taper for supporting the crankshaft on its axis comprising the steps as set forth in claim 1 including reciprocally moving said probe normal to the measuring axis to selectively engage the bearing surfaces.

5. A method of measuring axial dimensions on a crankshaft having a centering recess of a predetermined taper in each end of the crankshaft with a predetermined axial position of at least one of said recesses and crankshaft supporting structure having supporting cones of a complementary taper for supporting the crankshaft on its axis as set forth in claim 1 including preliminary aligning of the axis of the crankshaft by supporting the crankshaft in a resting position while firmly seating the supporting cones of said crankshaft supporting structure into the recesses in the ends of said crankshaft to center the crankshaft axis with the crankshaft supporting structure axis.

* * * * *